United States Patent
Bhat et al.

(10) Patent No.: US 10,725,916 B2
(45) Date of Patent: Jul. 28, 2020

(54) MAINTAINING DATA COHERENCY UTILIZING A HOLDING STAGE MEMORY COMPONENT

(71) Applicant: InvenSense, Inc., San Jose, CA (US)

(72) Inventors: Vinod Bhat, San Jose, CA (US); Amr Zaky, San Jose, CA (US); Jatin Gangani, Sunnyvale, CA (US)

(73) Assignee: InvenSense, Inc., San Jose, CA (US)

( * ) Notice: Subject to any disclaimer, the term of this patent is extended or adjusted under 35 U.S.C. 154(b) by 173 days.

(21) Appl. No.: 15/612,949

(22) Filed: Jun. 2, 2017

(65) Prior Publication Data

US 2018/0349279 A1    Dec. 6, 2018

(51) Int. Cl.
*G06F 12/0815* (2016.01)
*G01D 9/00* (2006.01)

(52) U.S. Cl.
CPC ......... *G06F 12/0815* (2013.01); *G01D 9/005* (2013.01); *G06F 2212/1032* (2013.01)

(58) Field of Classification Search
CPC ................................... G06F 3/05; G06F 3/12
See application file for complete search history.

(56) References Cited

U.S. PATENT DOCUMENTS

2002/0188773 A1* 12/2002 Augustijn ............ A61N 1/3702
710/52
2013/0242262 A1* 9/2013 Lewis ................ G02B 27/0093
351/209

* cited by examiner

*Primary Examiner* — Gary W. Cygiel (57) ABSTRACT

A system includes sensors, a first memory component, a second memory component, and an interface. The sensors are configured to generate data responsive to stimuli. Each sensor may transmit its associated data as it becomes available. The first memory component may receive and store sensor data. The second memory component may receive data from the first memory component. The interface may receive data from the second memory component. The sensor data generated during a time which the interface is receiving data from the second memory component is transmitted to the first memory component and stored thereto. No data is transmitted from the first memory component or from the sensors to the second memory component during the time which the interface is receiving data from the second memory component. Subsequently, a subset of data stored on the first memory component is advanced to the second memory component.

29 Claims, 4 Drawing Sheets

MAINTAINING DATA COHERENCY UTILIZING A HOLDING STAGE MEMORY COMPONENT

BACKGROUND

Many electronic devices utilize sensors for various applications, e.g., detecting motion, detecting finger print, detecting acceleration, etc. However, each sensor may sense data at a different rate and transmit it at a different rate. For example, an accelerometer may sample data at 50 Hz while a gyroscope sensor may sample data at 50-200 Hz. Accordingly, coherency between different sensors becomes a challenge when the data is processed by an application or a processor. Traditionally, the sensors may hold sampling until the interface/process has completed accessing the data before resuming with new sampled data. Unfortunately, holding the sampling may result in loss of data in the interim. In other traditional systems, a timestamp may be used. Unfortunately, using a timestamp is difficult and resource intensive.

SUMMARY

Accordingly, a need has arisen to provide data coherency between various sensors and between different instances of sensor samples. Moreover, a need has arisen to achieve data coherency with minimal impact on resources and resource utilization.

In some embodiments, a holding stage memory component may be used. The holding stage memory component receives data from multiple sensors as data becomes available. The received data is subsequently advanced to another memory component, e.g., a status register, to be accessed by an interface, e.g., interface to an application processor. While the status register is being accessed by the interface, no data is advanced from the holding stage memory component to the status register. As such, sensors transmit their respective data, as they become available to the holding stage memory component, without the data being advanced to the status register during the time which the interface is accessing the status register. Once the interface has completed accessing the status register, the data or a subset thereof in the holding stage memory component is advance to the status register for subsequent access by the interface. Accordingly, the need to use timestamp for data coherency is eliminated. Moreover, using the holding stage memory component enables data to be stored during interface access, thereby eliminating data loss by holding the sampling.

In some embodiments, an apparatus includes a plurality of sensors, a first memory component, a second memory component, and an interface. The plurality of sensors is configured to generate data responsive to stimuli. Each sensor of the plurality of sensors is further configured to transmit its associated generated data as the generated data becomes available. The first memory component is configured to receive and store data generated by the plurality of sensors. The second memory component is configured to receive data from the first memory component. The interface is configured to receive data from the second memory component. The data generated by the plurality of sensors during a time which the interface is receiving data from the second memory component is transmitted to the first memory component and stored thereto. No data is transmitted from the first memory component or from the plurality of sensors to the second memory component during the time which the interface is receiving data from the second memory component. Subsequent to the receiving by the interface, a data subset stored on the first memory component is advanced from the first memory component to the second memory component for subsequent receipt by the interface.

It is appreciated that the advancing of data from the first memory component to the second memory component may be responsive to a signal that the interface is ready to receive a next set of data. According to some embodiments, a flag is asserted when the interface is receiving data from the second memory component. A next set of data is not advanced from the first memory component to the second memory component to be received by the interface until the flag is unasserted. In some embodiments, the interface purges the data stored in the second memory component prior to advancing of a next set of data from the first memory component to the second memory component.

According to some embodiments, the first memory component may include a plurality of partitions. Each partition may store data associated with a corresponding sensor of the plurality of sensors. It is appreciated that a subset of the data may be advanced from a partition of the plurality of partitions of the first memory component to the second memory component to be received by the interface while another subset of the data remains stored at another partition of the first memory component without being advanced. In some embodiments, storing of the another subset of data at the another partition while the subset of data is advanced from the first memory component to the second memory component may be responsive to a signal from the interface. In some embodiments, the signal may be based on heuristics. According to some embodiments, the subset of the data is purged from the partition of the first memory component subsequent to advancing it to the second memory component and another data generated by the plurality of sensors is stored at the partition of the first memory component subsequent to the purging.

It is appreciated that the first memory component may be a register file and may be selected from a group consisting of SRAM, DRAM, flip-flops, and registers. Moreover, it is appreciated that the second memory component may be a register file and may be selected from a group consisting of SRAM, DRAM, flip-flops, and registers. It is appreciated that the plurality of sensors may be selected from a group consisting of an accelerometer, a gyroscope, magnetometer sensor, pressure sensor, gas sensor, an image sensor, and a fingerprint sensor.

These and other features and aspects of the concepts described herein may be better understood with reference to the following drawings, description, and appended claims.

DETAILED DESCRIPTION

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "forward," "reverse," "clockwise," "counter clockwise," "up," "down," or other similar terms such as "upper," "lower," "above," "below," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

A need has arisen to provide data coherency between various sensors. Moreover, a need has arisen to achieve data coherency with minimal impact on resources and resource utilization.

In some embodiments, a holding stage memory component may be used. The holding stage memory component receives data from multiple sensors as data becomes available. The received data is subsequently advanced to another memory component, e.g., a status register, to be accessed by an interface, e.g., interface to an application processor. While the status register is being accessed by the interface, no data is advanced from the holding stage memory component to the status register. As such, sensors transmit their respect data, as they become available to the holding stage memory component, without the data being advanced to the status register during the time which the interface is accessing the status register. Once the interface has completed accessing the status register, the data or a subset thereof in the holding stage memory component is advanced to the status register for subsequent access by the interface. Accordingly, the need to use timestamp for data coherency is eliminated. Moreover, using the holding stage memory component enables data to be stored during interface access, thereby eliminating data loss by holding the sampling.

Figure 1:
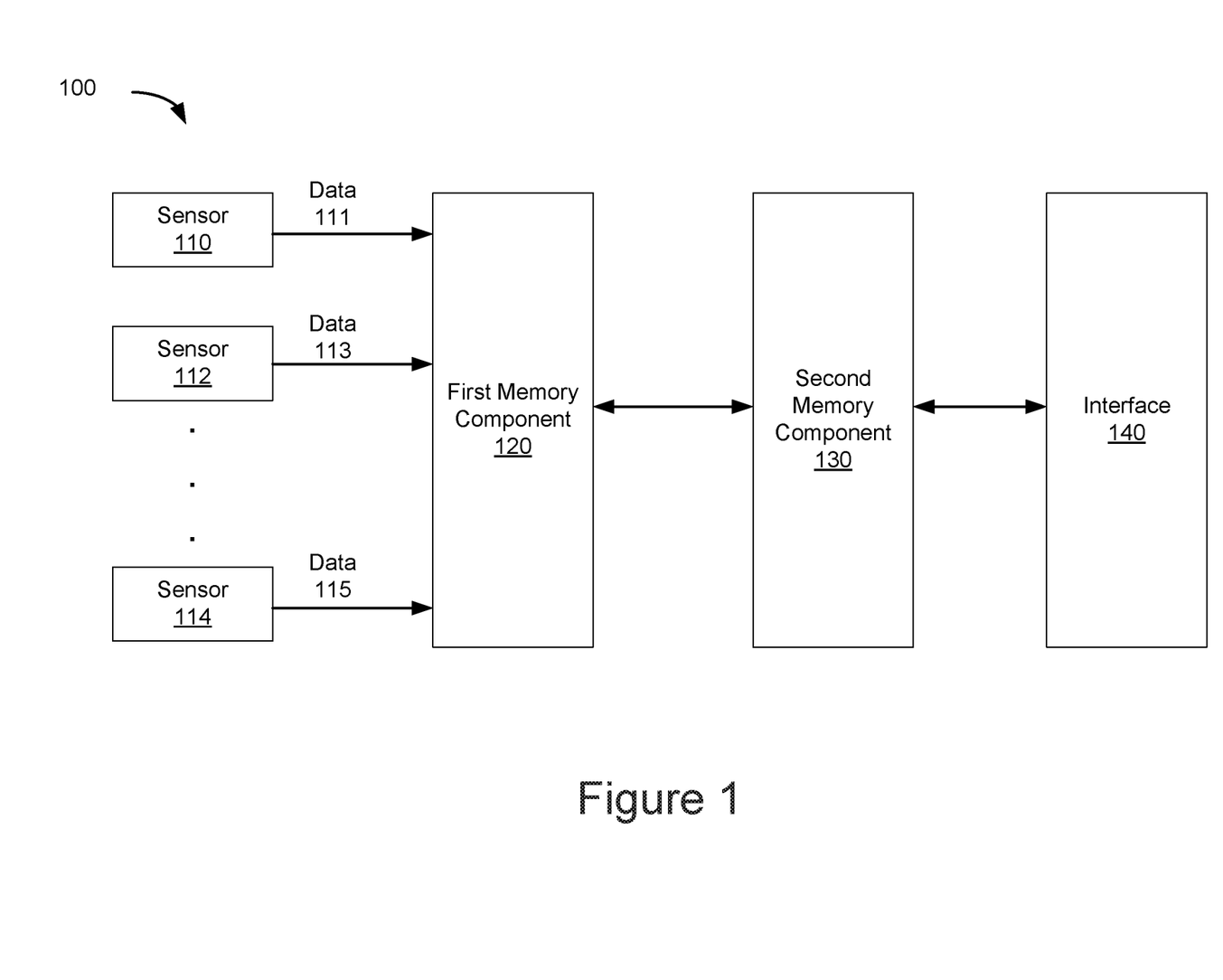
FIG. 1 shows an apparatus with a holding stage memory component in accordance with some embodiments.

Referring now to FIG. 1, an apparatus 100 with a holding stage memory component in accordance with some embodiments is shown. The apparatus 100 may include multiple sensors 110, 112, . . . , 114, a first memory component 120, a second memory component 130, and an interface 140 is configured to communicate with a processor or an application. It is appreciated that the first memory component 120 may also be referred to as a holding stage memory component and the second memory component 130 may be referred to as a status register or status memory component.

It is appreciated that the sensors 110, 112, . . . , 114 may be any number of sensors and may include an accelerometer, a gyroscope, magnetometer sensor, pressure sensor, gas sensor, an image sensor, a fingerprint sensor, etc. Each sensor may generate data responsive to stimuli, e.g., acceleration, pressure, etc. The generated data may be sampled in some instances. The data, e.g., data 111, 113, and 115, generated by the sensors 110, 112, . . . , 114 may subsequently be transmitted to the first memory component 120. It is appreciated that data 111, 113, and 115 may be transmitted to the first memory component 120 as they become available and as they are generated.

It is appreciated that the first memory component 120 may be a register file. In some embodiments, the first memory component 120 may be an SRAM, DRAM, flip-flops, registers, etc. The first memory component 120 is configured to store the data that is received from the sensors 110, 112, . . . , 114. It is further appreciated that each sensor may transmit the generated data as they become available. In other words, the first memory component 120 may receive information from various sensors at different instances in time and as data becomes available.

It is appreciated that the second memory component 130 may be a register file. In some embodiments, the second memory component 130 may be an SRAM, DRAM, flip-flops, registers, etc. In some embodiments, it is determined whether the interface 140 is accessing the second memory component 130. For example, it may be determined whether the interface 140 is reading and accessing that was previously stored in the second memory component 130.

In some embodiments, a processor (not shown) may determine whether the interface 140 is accessing or reading data from the second memory component 130. In some embodiments, the interface 140 itself may assert a flag indicating that it is accessing or reading data from the second memory component 130. In some embodiments, the flag may be asserted by a processor when the interface 140 is accessing or reading data from the second memory component 130.

The data received by the first memory component 120 from the sensors 110, 112, . . . , and/or 114 may be stored in the first memory component 120 if it is determined that the interface 140 is accessing or reading the data stored in the second memory component 130. It is appreciated that the data being stored in the first memory component 120 is not advanced or transmitted to the second memory component 130 if it is determined that the interface 140 is accessing or reading the data that is stored in the second memory component 130. It is appreciated that the data stored in the first memory component 120 may be advanced to the second memory component 130 once it is determined that the interface 140 is no longer accessing or reading data that was stored in the second memory component 130. It is appreciated that de-asserting the flag may indicate that the interface 140 is no longer accessing or reading data that was previously stored in the second memory component 130. It is also appreciated that the interface 140, at any point, may determine that no more data from the second memory component 130 is required and stop its access or reading of the data. For example, the interface 140 or a processor may determine that sufficient data is present to interpolate the data and thus it may stop transmission of any further data from the second memory component 130 to the interface 140 in order to save bandwidth, processing power, resources and to further save time. In some embodiments, the flag may be de-asserted when the interface 140 and/or a processor determines that no more data from the second memory component 130 is needed.

It is appreciated that in some embodiments, the second memory component 130 may contain some data that was previously advanced by the first memory component 120 when the second memory component 130 receives the additional data from the first memory component 120. In some embodiments, however, the data that was previously stored in the second memory component 130 may be purged prior to the data being advanced from the first memory component 120. It is appreciated that in some embodiments, a subset of the data that was previously stored in the second memory component 130 may be purged prior to the data being advanced from the first memory component 120. It is appreciated that purging of the data from the second memory component 130 may be responsive to a signal from the interface 140 and/or a processor.

It is appreciated that the data in the first memory component 120 may be purged in a similar manner as that of the second memory component 130. It is appreciated that illustration of the embodiments with two memory components, 120 and 130, is exemplary and not intended to limit the scope of the embodiments. For example, it is appreciated that the first memory component 120 and the second memory component 130 may be within the same memory component, e.g., different partitions of the same memory component. Moreover, it is appreciated that in some embodiments, more than two memory components may be used. It is also appreciated that the signal causing data to be advanced from the first memory component 120 to the second memory component 130 may be based on heuristics. Furthermore, it is appreciated that the signal causing data to be purged may be based on heuristics.

It is appreciated that utilizing the first memory component also referred to as a holding stage memory component, enables the sensors to continue transmitting data as they become available while the interface may access data that was previously stored. Thus, data coherency is maintained without using a timestamp and without loss of data.

Figure 2:
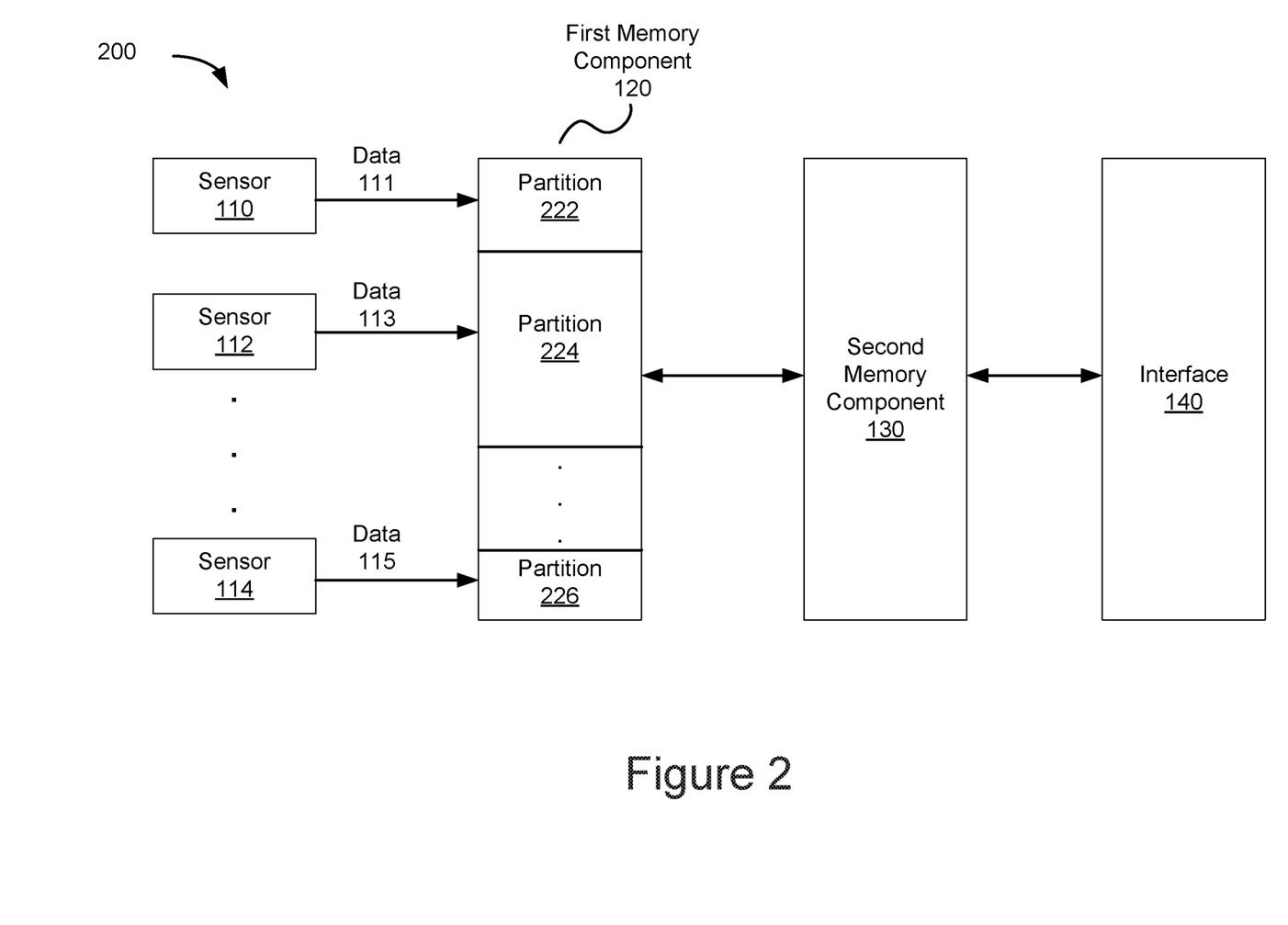
FIG. 2 shows another apparatus with a holding stage memory component in accordance with some embodiments.

Referring now to FIG. 2, another apparatus 200 with a holding stage memory component in accordance with some embodiments is shown. It is appreciated that the apparatus 200 is substantially similar to that of FIG. 1 and it operates substantially the same. However, the first memory component 120 of FIG. 2 may include a plurality of partitions 222, 224, . . . , 226. It is appreciated that each partition or a plurality of partitions may be associated with a given sensor. For example, in some embodiments, partition 222 may be associated with sensor 110, partition 224 may be associated with sensor 112, and partition 226 may be associated with sensor 114. It is appreciated that in some embodiments, more than one partition may be associated with a sensor. For example, in some embodiments, partitions 222 and 224 may be associated with sensor 110. It is appreciated that partitioning the first memory component 120 enables selective purging of data from the first memory component 120. For example, in response to a signal, data stored in partition 224 may be purged while data stored in partitions 222 and 226 are maintained.

Partitioning the holding stage memory component enables selective advancement of the data. For example, in some embodiments, when the interface 140 is ready to access the second memory component 130, it may be determined that the only data of interest may be from sensor 110. As such, only data stored in partition 222 may be advanced from the first memory component 120 to the second memory component 130. Similarly, it may be determined that the only data of interest may be from sensor 112. As such, only data stored in partition 224 may be advanced from the first memory component 120 to the second memory component 130. Similarly, it may be determined that the only data of interest may be from sensor 114. As such, only data stored in partition 226 may be advanced from the first memory component 120 to the second memory component 130. It is appreciated that in some embodiments, it may be determined that a combination of data from the sensor 110 and 112 is of interest. As such, only data stored in partitions 222 and 224 may be advanced from the first memory component 120 to the second memory component 130. Thus, the system functions more efficiently by ridding the system from accessing data that is no longer of interest.

It is appreciated that utilizing the first memory component (also referred to as a holding stage memory component), enables the sensors to continue transmitting data as they become available while the interface may access data that was previously stored. Thus, data coherency is maintained without using a timestamp and without loss of data.

Figure 3:
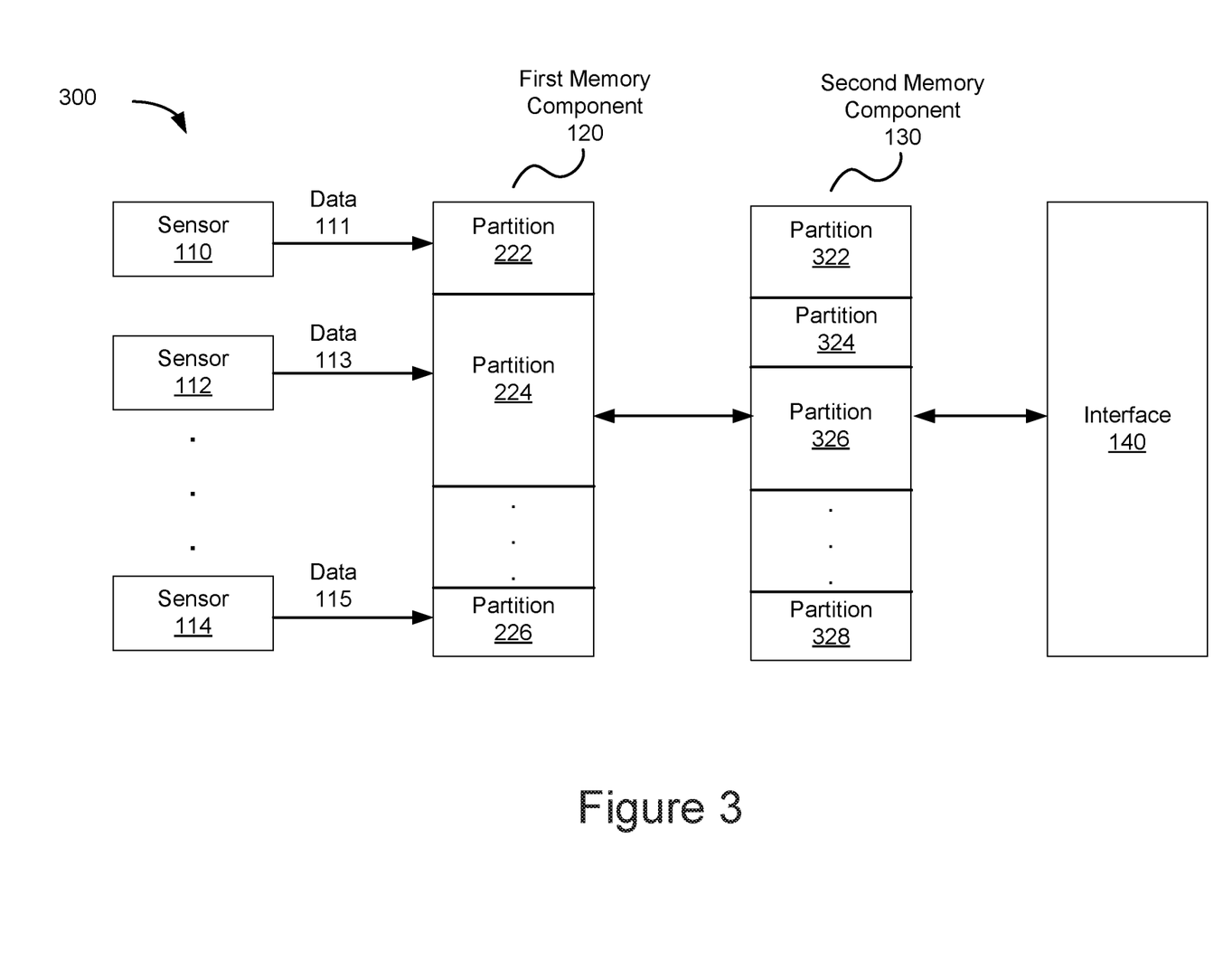
FIG. 3 shows a system with a holding stage memory component in accordance with some embodiments.

Referring now to FIG. 3, a system 300 with a holding stage memory component in accordance with some embodiments is shown. It is appreciated that the apparatus 300 is substantially similar to that of FIG. 2 and it operates substantially the same. However, the second memory component 130 of FIG. 3 may include a plurality of partitions 322, 324, . . . , 326. It is appreciated that each partition or a plurality of partitions may be associated with a given sensor. For example, in some embodiments, partition 322 may be associated with sensor 110, partition 324 may be associated with sensor 112, and partitions 326 and 328 may be associated with sensor 114. It is appreciated that in some embodiments, more than one partition may be associated with a sensor or each partition may be associated with a sensor. It is appreciated that partitioning the second memory component 130 enables selective purging of data from the second memory component 130. For example, in response to a signal, data stored in partition 324 may be purged while data stored in partitions 322, 326, and 328 are maintained.

Partitioning the second memory component 130 enables selective accessing or reading by the interface 140 while at the same time enabling data advancement from the first memory component 120 to the second memory component 130. For example, the interface 140 may be accessing or reading data from partition 322 while data from the first memory component 120 is being advanced to other partitions of the second memory component 130, e.g., partitions 324, 326, . . . , 328. Similarly, the interface 140 may be accessing or reading data from partition 326 while data from the first memory component 120 is being advanced to other partitions of the second memory component 130, e.g., partitions 322, 324, and 328.

It is appreciated that in some embodiments, the interface accessing a partition in the second memory component 130 associated with a sensor prevents any data advancement from a partition in the first memory component 120 that is associated with that particular sensor. For example, if partitions 322 and 324 are associated with sensor 110 and if partition 222 is also associated with sensor 110, then if the interface 140 is accessing partition 322 and/or 324, then no data from partition 222 may be advanced to the second memory component 130 at the time that the interface 140 is accessing partitions 322 and/or 324. However, it is appreciated that at the time that data is being accessed or read by the interface 140, other data from other partitions of the first memory component 120, e.g., partitions 224, . . . , 226 may be advanced to partitions 326, . . . , and 328 of the second memory component 130.

It is appreciated that utilizing the first memory component also referred to as a holding stage memory component, enables the sensors to continue transmitting data as they become available while the interface may access data that was previously stored. Thus, data coherency is maintained without using a timestamp and without loss of data.

Figure 4:
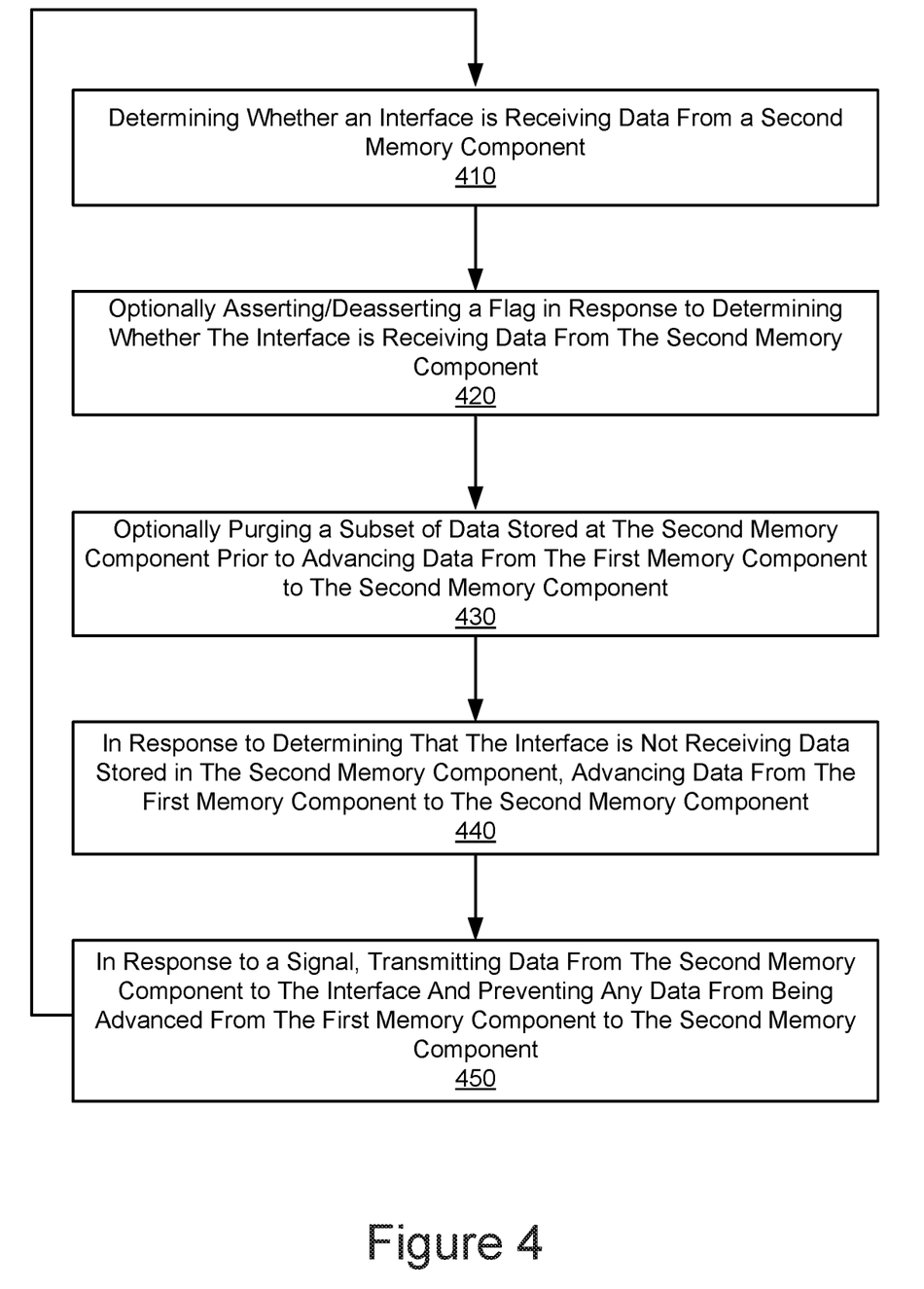
FIG. 4 shows a method flow diagram in accordance with some embodiments.

Referring now to FIG. 4, a method 400 flow diagram in accordance with some embodiments is shown. At step 410, it is determined whether an interface is receiving or reading from a second memory component. Optionally, at step 420, a flag may be asserted or de-asserted in response to the determination in step 410. For example, a flag may be asserted if the interface is reading data from the second memory component and de-asserted if the interface is not reading data from the second memory component. In other embodiments, a flag may be de-asserted if the interface is reading data from the second memory component and asserted if the interface is not reading data from the second memory component.

Optionally, at step 430, a subset of data stored in the second memory component may be purged. For example, the data associated with one sensor may be purged while other data from other sensors may be retained. It is appreciated that the purging may occur prior to advancing any data from the first memory component to the second memory component. Similarly, a subset of data stored in the first memory component may be purged. For example, the data associated with one sensor may be purged while other data from other sensors may be retained.

At step 440, in response to determining that the interface is not receiving data stored in the second memory component, the data or subset of data stored in the first memory component is advanced to the second memory component. At step 450, in response to a signal, e.g., from an interface or from a processor, data from the second memory component may be transmitted or accessed and read by the interface. It is appreciated that while the second memory component is being accessed or read from by the interface, no data from the first memory component is advanced to the second memory component. It is, however, appreciated that in some embodiments using partitions within the second memory component, as described in FIG. 3, enables concurrent reading of data from the second memory component and advancement of other data from the first memory component to the second memory component while maintaining the data coherency. The process may repeat itself.

It is appreciated that utilizing the first memory component also referred to as a holding stage memory component, enables the sensors to continue transmitting data as they become available while the interface may access data that was previously stored. Thus, data coherency is maintained without using a timestamp and without loss of data.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A system comprising:
a plurality of sensors configured to sample sensed data associated with the sensing;
a first memory component comprising a first plurality of partitions, wherein the first memory component is configured to receive a first plurality of sample sensed data from the plurality of sensors;
a second memory component comprising a second plurality of partitions, wherein the second memory component is configured to selectively receive a first subset of the first plurality of sample sensed data from one or more partitions of the first plurality of partitions, and wherein the second memory component is configured to selectively transmit a second subset of the first plurality of sample sensed data to an interface and wherein the second subset is a subset of the first subset; and
the interface configured to receive the second subset of the first plurality of sample sensed data from the second memory component, wherein a second plurality of sample sensed data generated by the plurality of sensors is stored in the first memory component during a time that the interface receives the second subset of the first plurality of sample sensed data from the second memory component.

2. The system as described in claim 1, wherein the second plurality of sample sensed data is transmitted from the first memory component to the second memory component to be received by the interface subsequent thereto, wherein the transmission of the second plurality of sample sensed data from the first memory component to the second memory component is responsive to a signal that the interface is ready to receive the second plurality of sample sensed data.

3. The system as described in claim 1, wherein the interface purges the subset of the first plurality of sample sensed data from the second memory component prior to transmission of the second plurality of sample sensed data from the first memory component to the second memory component.

4. The system as described in claim 1, wherein a flag is asserted when the first plurality of sample sensed data is being received by the interface, and wherein the second plurality of sample sensed data is not advanced from the first memory component to the second memory component for reading by the interface until the flag is de-asserted.

5. The system as described in claim 1, wherein each partition of the first plurality of partitions stores sample sensed data associated with a corresponding sensor of the plurality of sensors.

6. The system as described in claim 5, wherein a subset of the second plurality of sample sensed data is transmitted from a partition of the first plurality of partitions of the first memory component to the second memory component to be received by the interface while another subset of the second plurality of sample sensed data remains stored at another partition of the first plurality of partitions of the first memory component, and wherein storing of the another subset of the second plurality of sample sensed data at the another partition while the subset of the second plurality of sample sensed data is transmitted from the first memory component to the second memory component is responsive to a signal from the interface.

7. The system as described in claim 6, wherein the signal is based on heuristics.

8. The system as described in claim 6, wherein the subset of the second plurality of sample sensed data is purged from the partition of the first plurality of partitions of the first memory component subsequent to its transmission to the second memory component and wherein a third plurality of sample sensed data is stored at the partition of the first plurality of partitions of the first memory component subsequent to the purging.

9. The system as described in claim 1, wherein the first memory component is a register file and is selected from a group consisting of SRAM, DRAM, flip-flops, and registers, and wherein the second memory component is a register file and is selected from a group consisting of SRAM, DRAM, flip-flops, and registers.

10. The system as described in claim 1, wherein the plurality of sensors is selected from a group consisting of an accelerometer, a gyroscope, magnetometer sensor, pressure sensor, gas sensor, an image sensor, and a fingerprint sensor.

11. An apparatus comprising:
a plurality of sensors configured to generate data responsive to a stimuli, wherein each sensor of the plurality of sensors is further configured to transmit its associated generated data as the generated data becomes available;
a first memory component comprising a plurality of partitions, wherein the first memory component is configured to selectively receive and store data generated by the plurality of sensors;
a second memory component configured to selectively receive a subset of data from one or more partitions of the plurality of partitions of the first memory component, and wherein the second memory component is configured to selectively transmit another subset of the data that is received from the first memory component to an interface, and wherein the another subset of data is a subset of the subset of data; and
the interface configured to receive the another subset of data from the second memory component, wherein data generated by the plurality of sensors during a time which the interface is receiving data from the second memory component is transmitted to the first memory component and stored thereto and wherein no data is transmitted from the first memory component or from the plurality of sensors to the second memory component during the time which the interface is receiving data from the second memory component, and wherein subsequent to the receiving by the interface a data subset stored on the first memory component is advanced from the first memory component to the second memory component for subsequent receipt by the interface.

12. The apparatus as described in claim 11, wherein the advancing of data from the first memory component to the second memory component is responsive to a signal that the interface is ready to receive a next set of data.

13. The apparatus as described in claim 11, wherein the interface purges the data stored in the second memory component prior to advancing of a next set of data from the first memory component to the second memory component.

14. The apparatus as described in claim 11, wherein a flag is asserted when the interface is receiving data from the second memory component, and wherein a next set of data is not advanced from the first memory component to the second memory component to be received by the interface until the flag is de-asserted.

15. The apparatus as described in claim 11, wherein each partition stores data associated with a corresponding sensor of the plurality of sensors.

16. The apparatus as described in claim 11, wherein the subset of the data is advanced from a partition of the plurality of partitions of the first memory component to the second memory component to be received by the interface while a different subset of the data remains stored at another partition of the first memory component without being advanced, and wherein storing of the different subset of data at the another partition while the subset of data is advanced from the first memory component to the second memory component is responsive to a signal from the interface.

17. The apparatus as described in claim 16, wherein the signal is based on heuristics.

18. The apparatus as described in claim 16, wherein the subset of the data is purged from the partition of the first memory component subsequent to advancing it to the second memory component and wherein another data generated by the plurality of sensors is stored at the partition of the first memory component subsequent to the purging.

19. The apparatus as described in claim 11, wherein the first memory component is a register file and is selected from a group consisting of SRAM, DRAM, flip-flops, and registers, and wherein the second memory component is a register file and is selected from a group consisting of SRAM, DRAM, flip-flops, and registers.

20. The apparatus as described in claim 11, wherein the plurality of sensors is selected from a group consisting of an accelerometer, a gyroscope, magnetometer sensor, pressure sensor, gas sensor, an image sensor, and a fingerprint sensor.

21. A method comprising:
determining whether an interface is receiving a subset of data stored in a first memory component;
in response to determining that the interface is receiving the subset of data stored in the first memory component, storing additional data generated by a plurality of sensors in a second memory component;
in response to determining that the interface is not receiving the subset of data stored in the first memory component, selectively advancing another subset of data stored in partitions of the second memory to the first memory component wherein the another subset of data is a subset of the subset of data stored in the first memory component; and
in response to a signal, transmitting data from the first memory component to the interface and preventing any data from being advanced from the second memory component to the first memory component.

22. The method as described in claim 21, wherein the first memory component is different from the second memory component.

23. The method as described in claim 21, wherein the first memory component and the second memory components are within a partitions within a same memory component.

24. The method as described in claim 21, wherein the signal indicates that the interface is ready to receive data.

25. The method as described in claim 21 further comprising:
purging the subset of data stored at the first memory component prior to advancing data from the second memory component to the first memory component.

26. The method as described in claim 21 further comprising:
asserting a flag when data is being received by the interface, and wherein data from the second memory component is not advanced to the first memory component until the flag is de-asserted.

27. The method as described in claim 26 further comprising:
de-asserting the flag in response to a signal from the interface that the interface has completed accessing the first memory component.

28. The method as described in claim 21 further comprising:
terminating transfer of data from the first memory component to the interface prior to all data stored in the first memory component being read by the interface, wherein the terminating is responsive to a signal from the interface.

29. The method as described in claim 21, wherein the advancing of data from the second memory component to the first memory component is based on heuristics.

\* \* \* \* \*